(12) United States Patent
Tryon et al.

(10) Patent No.: US 8,497,028 B1
(45) Date of Patent: Jul. 30, 2013

(54) MULTI-LAYER METALLIC COATING FOR TBC SYSTEMS

(75) Inventors: Brian S. Tryon, Glastonbury, CT (US); David A. Litton, West Hartford, CT (US); Benjamin Joseph Zimmerman, Enfield, CT (US); Russell A. Beers, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 99 days.

(21) Appl. No.: 12/987,319

(22) Filed: Jan. 10, 2011

(51) Int. Cl.
*B32B 15/04* (2006.01)
*B32B 15/20* (2006.01)
*F01D 5/14* (2006.01)
*F01D 5/28* (2006.01)

(52) U.S. Cl.
USPC ........... 428/680; 428/627; 428/632; 428/610; 416/241 R

(58) Field of Classification Search
USPC ................ 428/680, 679, 678, 627, 632, 633, 428/610
See application file for complete search history.

(56) References Cited

U.S. PATENT DOCUMENTS

| | | | |
|---|---|---|---|
| 2007/0264523 A1* | 11/2007 | Hu et al. | 428/636 |
| 2009/0075115 A1 | 3/2009 | Tryon et al. | |
| 2009/0258165 A1 | 10/2009 | Tryon et al. | |
| 2011/0256421 A1* | 10/2011 | Bose et al. | 428/680 |

* cited by examiner

Primary Examiner — Michael La Villa
(74) Attorney, Agent, or Firm — Bachman & LaPointe, P.C.

(57) ABSTRACT

A coating system for a turbine engine component having a substrate includes a multi-layer bond coat applied to the substrate. The multi-layer bond coat has an oxidation resistant layer and a spallation resistant layer deposited over the oxidation resistant layer. Processes for forming the coating system are described.

10 Claims, 2 Drawing Sheets

MULTI-LAYER METALLIC COATING FOR TBC SYSTEMS

STATEMENT OF GOVERNMENT INTEREST

The Government of the United States of America may have rights in the present invention as a result of Contract No. N00014-07-C-0503 awarded by the Office of Naval Research.

BACKGROUND

The present disclosure relates to a coating system for a turbine engine component which includes a multi-layer metallic bond coat which includes an oxidation resistant layer and a spallation resistant layer.

Advanced thermal barrier coating systems provide a means for sheltering the structural element, i.e. a turbine blade or vane, from the highest temperatures in the engine. Metallic bond coats are added to the surface of the substrate to form a reaction product of thermally grown oxide (TGO) of alumina between the bond coat and the thermal barrier coating topcoat. As superalloy technology advances, the maximum use temperature in which these components must operate continues to climb leading both to more efficient operation and increasingly harsh operating conditions.

SUMMARY

In accordance with the instant disclosure, there is provided a coating system for a turbine engine component having a substrate, which coating system broadly comprises a multi-layer bond coat applied to said substrate; and said multi-layer bond coat having an oxidation resistant layer and a spallation resistant layer deposited over said oxidation resistant layer.

Further in accordance with the instant disclosure, there is provided a process for forming a coating system on a turbine engine component which broadly comprises the steps of: providing a substrate; depositing a multi-layer bond coating on said substrate, wherein said depositing step comprises depositing an oxidation resistant layer and thereafter depositing a spallation resistant layer over said oxidation resistant layer.

Other details of the multi-layer metallic coating for thermal barrier coating systems are set forth in the following detailed description and the accompanying drawings wherein like reference numerals depict like elements.

DETAILED DESCRIPTION OF THE PREFERRED EMBODIMENT(S)

Figure 2:
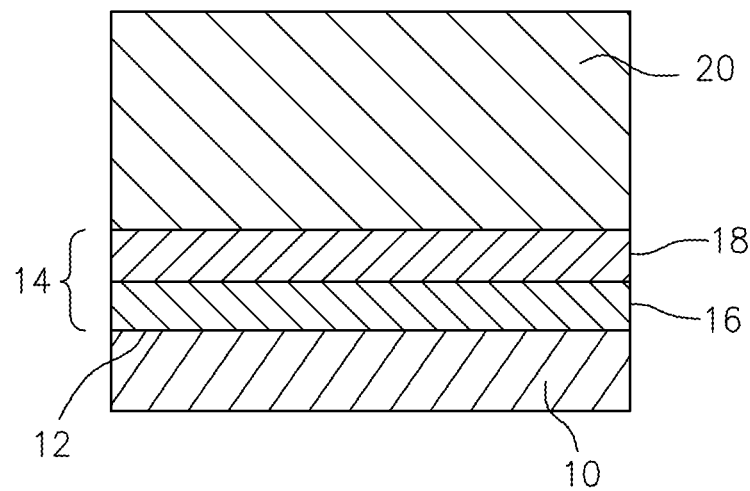
FIG. 2 is a schematic representation of a coating system in accordance with the instant disclosure.

Referring now to FIG. 2, the present disclosure relates to a coating system for a turbine engine component such as a turbine vane or blade. The turbine engine component has a substrate 10 which may be formed from a superalloy material such as a nickel-based superalloy.

Applied to a surface 12 of the substrate is a bond coat 14. Unlike typical bond coats formed from a single layer of a MCrAlY material, the bond coat 14 is a multi-layer coating having an oxidation resistant layer 16 and a spallation resistant layer 18.

The oxidation resistant layer 16 may comprise a MCrAlY composition such as one having a composition consisting of 20 to 24 wt % cobalt, 14 to 18 wt % chromium, 11 to 13.5 wt % aluminum, 0.1 to 0.4 wt % hafnium, 0.4 to 0.8 yttrium, 0.4 to 0.7 wt % silicon, balance nickel. The layer 16 may have a thickness in the range of about 0.5 mil to 7 mil.

In accordance with the instant disclosure, the surface of the oxidation resistant layer 16 is modified with about 0.25 mil to 7.0 mil of a spallation resistant overlay coating or layer 18 of a different composition. The spallation resistant layer 18 has a composition tailored to form an adherent thermally grown oxide layer (TGO). The spallation resistant layer 18 may have a composition consisting of from 10 to 13 wt % cobalt, from 5.5 to 7.0 wt % chromium, 3.0 to 6.0 wt % tantalum, 3.0 to 5.0 wt % tungsten, 1.1 to 1.7 wt % molybdenum, 9.0 to 11 wt % aluminum, 0.2 to 0.6 wt % hafnium, 0.3 to 0.7 wt % yttrium, from 0.1 to 0.3 wt % silicon, from 0.1 to 0.2 wt % zirconium, and the balance nickel. Alternatively, the spallation resistant layer 18 may have a composition consisting of from 11 to 14 wt % cobalt, from 11 to 14 wt % chromium, from 7.5 to 9.5 wt % aluminum, from 0.1 to 0.5 wt % hafnium, from 0.2 to 0.6 wt % yttrium, from 0.1 to 0.3 wt % silicon, from 0.1 to 0.2 wt % zirconium, and the balance nickel.

The oxidation resistant layer 16 and the spallation resistant layer 18 may each be deposited using a cathodic arc deposition technique which can be single insertion processing or dual-insertion metallic coating processing. Following deposition, the substrate 10 with the layers 16 and 18 may be subjected to a diffusion heat treatment. The diffusion heat treatment may be up to 32 hours in temperatures ranging from approximately 1600° F. to 2000° F. in an argon shrouded atmosphere. An example of a useful heat treatment would be 4 hours at 1975° F. in a partial pressure argon atmosphere. The diffusion heat treatment is necessary in order to improve the coating adhesion to the substrate and facilitate mechanical densification processing and surface modification prior to TBC coating.

The diffused bond layer coating 14 formed from the layers 16 and 18, when the first composition for the spallation layer 18 mentioned above is used, has an average composition of the two layers which consists of from 10 to 24 wt % cobalt, from 5.5 to 18 wt % chromium, up to 6 wt % tantalum, up to 5.0 wt % tungsten, up to 1.7 wt % molybdenum, from 9 to 13.5 wt % aluminum, 0.1 to 0.6 wt % hafnium, 0.3 to 0.8 wt % yttrium, 0.1 to 0.7 wt % silicon, up to 0.2 wt % zirconium, and the balance nickel. When the second composition for the spallation layer mentioned above is used, the diffused bond layer coating 14 has a composition consisting of from 11 to 24 wt % cobalt, from 11 to 18 wt % chromium, up to 6 wt % tantalum, up to 5.0 wt % tungsten, up to 1.7 wt % molybdenum, from 7.5 to 13.5 wt % aluminum, 0.1 to 0.5 wt % hafnium, 0.2 to 0.8 wt % yttrium, 0.1 to 0.7 wt % silicon, up to 0.2 wt % zirconium, and the balance nickel.

Following the diffusion heat treatment, the thermal barrier coating 20 is applied over the multi-layer bond coat. To prepare the metallic coating for thermal barrier coating application, the surface of the metallic coating is mechanically densified. Further the surface modification may be necessary in order to smooth and clean the surface in preparation for TBC deposition.

The thermal barrier coating 20 may have a duplex/multi-layer thermal barrier coating architecture. Thermal barrier coatings which may be applied include single or multiple layers of yittria-stabilized and/or cubic lanthanide oxidedoped zirconia (or layers of both) deposited via electron-beam physical vapor deposition or air plasma spray methods. The lanthanide oxides have the formula $Ln_2O_3$, where Ln=La, Ce, Pr, Nd, Pm, Sm, Eu, Gd, Tb, Dy, Ho, Er, Tm, Yb, and Lu. Alternatively, $Y_2O_3$, $Sc_2O_3$, $In_2O_3$, CaO, MgO could be used to dope the cubic zirconia, along with mixtures thereof, and mixtures with any of the lanthanide oxides.

In use, should the thermal barrier coating suffer spallation, the oxidation resistant coating 14 is formed by the layers 16 and 18.

Figure 1:
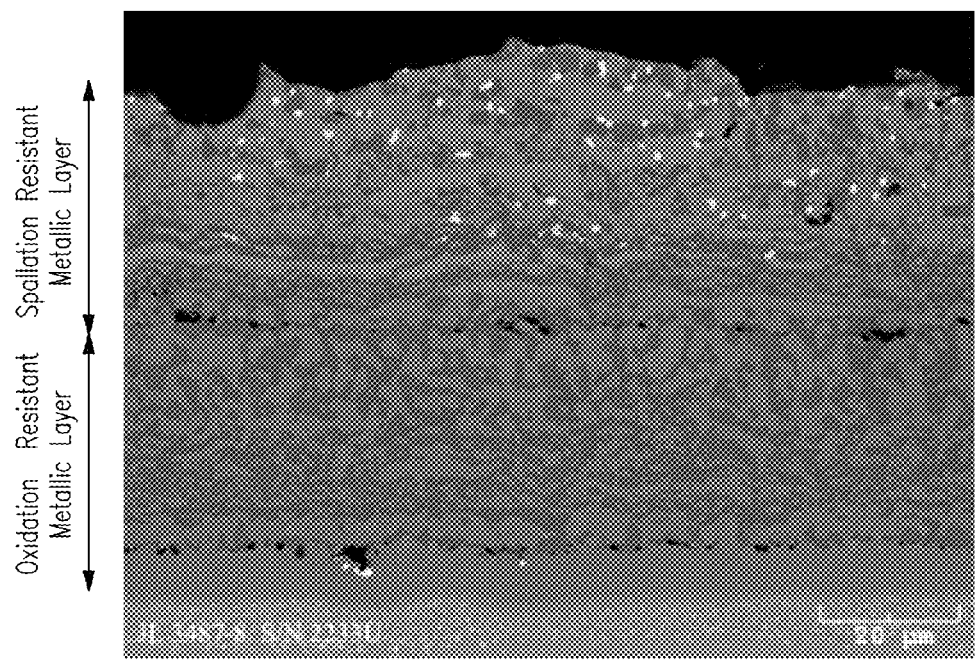
FIG. 1 is a photomicrograph showing a 1 mil spallation-resistant layer above a 1 mil oxidation resistant layer.

A coating in accordance with the present disclosure was formed as shown in FIG. 1. The coating was formed by preparing a substrate surface via grit blasting and ultrasonic cleaning followed by alcohol cleaning. The substrate was placed into a cathodic arc chamber along with an ingot of an oxidation resistant coating composition as described hereinabove where the oxidation resistant coating composition was deposited. The coating process was then interrupted wherein an oxidation resistant ingot was replaced with a spallation resistant composition as described hereinabove. The coated substrates were then removed from the coating chamber and diffusion heat treated as described hereinabove.

Figure 3:
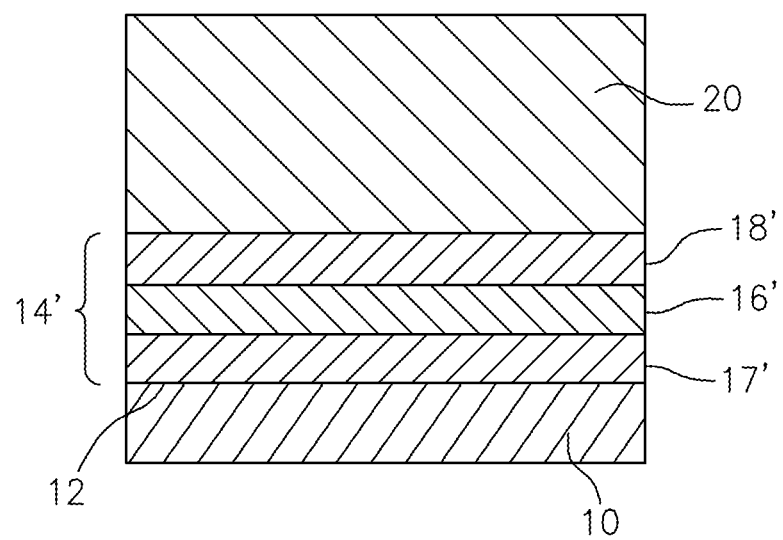
FIG. 3 is a schematic representation of an alternative coating system in accordance with the instant disclosure.

While the bond layer coating 14 has been described as a two layer metallic coating, as shown in FIG. 3, it could also be a tri-layer metallic coating 14' having a topmost layer 18' with a composition which forms a spallation resistant thermally grown oxide (TGO), a layer 16' which provides the oxidation resistance, and an interfacial layer 17' which is located between the layer 16' and the substrate 10. The layer 17' acts to prevent/reduce the formation of secondary reaction zones (SRZ) between the metallic coatings and the substrate. The layer 18' may have a composition such as that set forth for layer 18 hereinabove. Layer 16' may have a composition such as that set forth for layer 16 hereinabove. The layer 17' may have a composition similar to the spallation layer but having a low aluminum content. This interfacial layer 17' may have a composition consisting of from 11 to 14 wt % cobalt, from 11 to 14 wt % chromium, from 7.5 to 9.5 wt % aluminum, from 0.1 to 0.5 wt % hafnium, from 0.2 to 0.6 wt % yttrium, from 0.1 to 0.3 wt % silicon, from 0.1 to 0.2 wt % zirconium, and the balance nickel. Alternatively, another suitable composition for the diffusion barrier layer 17' is from 4.5 to 5.5 wt % cobalt, from 9.5 to 10.5 wt % chromium, from 4.0 to 5.5 wt % aluminum, up to 2.0 wt % titanium, about 12 wt % tantalum, and the balance nickel.

Preliminary burner rig oxidation testing of the dual-layer cat arc coating has shown very promising spallation and oxidation resistance compared to single layer/single compositions coatings. Thermal cycles at maximum temperatures ranging from about 2050° F. to about 2150° F. were conducted in a burner rig test facility to evaluate the spallation and oxidation resistance of these bi-layer metallic coating systems. The TBC spallation resistance improvement using the coating system described herein ranged from 200% to 800% improvement over a conventional bill-of-material bond coat. The oxidation resistance improvement using the coating system described herein ranged from about 15% to 44% improvement over the conventional bill-of-material (oxidation resistant) bond coat.

The increased oxidation and spallation resistance provided by the coatings disclosed herein can provide improved part life (longer time on-wing) and/or improved thermal efficiency for the engine (reducing TSFC).

The various layers of the coating systems disclosed herein may be fabricated by a process using a single-insertion processing method by which all layers may be formed in succession without breaking vacuum. Single-insertion processing is useful because it reduces the processing costs associated with the production of a multi-layer metallic coating via conventional methods. Alternatively, the various layers of the coating systems disclosed herein may be fabricated by a multiple insertion process such as a dual insertion method. Still further, fabrication processes include LPPS, EB-PVD, sputtering, and cathodic arc deposition.

There has been disclosed herein a multi-layer metallic coating for thermal barrier coating systems. While the coating has been described in the context of specific embodiments thereof, other unforeseen alternatives, modifications, and variations may be apparent to those skilled in the art having read the foregoing disclosure. Accordingly, it is intended to embrace those alternatives, modifications, and variations, as fall within the broad scope of the appended claims.

What is claimed is:

1. A coating system for a turbine engine component having a substrate, said coating system comprising:
   a multi-layer bond coat applied to said substrate; and
   said multi-layer bond coat having an oxidation resistant layer and a spallation resistant layer deposited over said oxidation resistant layer,
   wherein said spallation resistant layer has a composition consisting of from 10 to 13 wt % cobalt, from 5.5 to 7.0 wt % chromium, 3.0 to 6.0 wt % tantalum, 3.0 to 5.0 wt % tungsten, 1.1 to 1.7 wt % molybdenum, 9.0 to 11 wt % aluminum, 0.2 to 0.6 wt % hafnium, 0.3 to 0.7 wt % yttrium, from 0.1 to 0.3 wt % silicon, from 0.1 to 0.2 wt % zirconium, and the balance nickel.

2. The coating system of claim 1, further comprising a thermal barrier coating deposited over said multi-layer bond coat.

3. The coating system of claim 1, wherein said oxidation resistant layer has a composition consisting of 20 to 24 wt % cobalt, 14 to 18 wt % chromium, 11 to 13.5 wt % aluminum, 0.1 to 0.4 wt % hafnium, 0.4 to 0.8 yttrium, 0.4 to 0.7 wt % silicon, balance nickel.

4. The coating system of claim 1, wherein said multi-layer bond coat has an average composition consisting of from 10 to 24 wt % cobalt, from 5.5 to 18 wt % chromium, up to 6 wt % tantalum, up to 5.0 wt % tungsten, up to 1.7 wt % molybdenum, from 9 to 13.5 wt % aluminum, 0.1 to 0.6 wt % hafnium, 0.3 to 0.8 wt % yttrium, 0.1 to 0.7 wt % silicon, up to 0.2 wt % zirconium, and the balance nickel.

5. The coating system of claim 1, wherein said multi-layer bond coat has an average composition consisting of from 11 to 24 wt % cobalt, from 11 to 18 wt % chromium, up to 6 wt % tantalum, up to 5.0 wt % tungsten, up to 1.7 wt % molybdenum, from 7.5 to 13.5 wt % aluminum, 0.1 to 0.5 wt % hafnium, 0.2 to 0.8 wt % yttrium, 0.1 to 0.7 wt % silicon, up to 0.2 wt % zirconium, and the balance nickel.

6. The coating system of claim 1, further comprising said multi-layer bond coat having an interfacial layer between said oxidation resistant layer and said substrate.

7. The coating system of claim 6, wherein said interfacial layer has a composition consisting of from 11 to 14 wt % cobalt, from 11 to 14 wt % chromium, from 7.5 to 9.5 wt % aluminum, from 0.1 to 0.5 wt % hafnium, from 0.2 to 0.6 wt % yttrium, from 0.1 to 0.3 wt % silicon, from 0.1 to 0.2 wt % zirconium, and the balance nickel.

8. A coating system for a turbine engine component having a substrate, said coating system comprising:
   a multi-layer bond coat applied to said substrate; and
   said multi-layer bond coat having an oxidation resistant layer and a spallation resistant layer deposited over said oxidation resistant layer;

said multi-layer bond coat having an interfacial layer between said oxidation resistant layer and said substrate, wherein said interfacial layer has a composition consisting of 4.5 to 5.5 wt % cobalt, from 9.5 to 10.5 wt % chromium, from 4.0 to 5.5 wt % aluminum, up to 2.0 wt % titanium, about 12 wt % tantalum, and the balance nickel.

9. The coating system of claim 8, wherein said spallation resistant layer has a composition consisting of from 10 to 13 wt % cobalt, from 5.5 to 7.0 wt % chromium, 3.0 to 6.0 wt % tantalum, 3.0 to 5.0 wt % tungsten, 1.1 to 1.7 wt % molybdenum, 9.0 to 11 wt % aluminum, 0.2 to 0.6 wt % hafnium, 0.3 to 0.7 wt % yttrium, from 0.1 to 0.3 wt % silicon, from 0.1 to 0.2 wt % zirconium, and the balance nickel.

10. The coating system of claim 8, wherein said spallation resistant layer has a composition consisting of from 11 to 14 wt % cobalt, from 11 to 14 wt % chromium, from 7.5 to 9.5 wt % aluminum, from 0.1 to 0.5 wt % hafnium, from 0.2 to 0.6 wt % yttrium, from 0.1 to 0.3 wt % silicon, from 0.1 to 0.2 wt % zirconium, and the balance nickel.

* * * * *